United States Patent
Maiorino

[11] 3,765,284
[45] Oct. 16, 1973

[54] PNEUMATIC CONVEYING DEVICE CONTROLLED BY AN ELECTRONIC PROGRAMMER FOR MACHINES FOR WORKING STACKED SHEET MATERIAL

[75] Inventor: Giuseppe Maiorino, Napoli, Italy

[73] Assignee: FMI – Mecfond – Aziende Meccaniche Riunite S.p.A., Napoli, Italy

[22] Filed: Dec. 23, 1971

[21] Appl. No.: 211,326

[30] Foreign Application Priority Data
June 25, 1971 Italy .............................. 51242 A/71

[52] U.S. Cl. ........................... 83/71, 83/281, 83/522
[51] Int. Cl. ............................................... B26d 5/36
[58] Field of Search ..................... 83/71, 522, 281, 83/414, 72, 202, 207, 225, 576

[56] References Cited
UNITED STATES PATENTS

| | | | |
|---|---|---|---|
| 2,305,191 | 12/1942 | Pearson et al. | 83/281 |
| 3,664,217 | 5/1972 | Schiewek et al. | 83/71 |
| 3,264,915 | 8/1966 | Peterson et al. | 83/71 |
| 1,916,378 | 7/1933 | Leland | 83/281 |
| 3,602,348 | 8/1971 | Mohr | 83/522 |

Primary Examiner—Donald R. Schran
Attorney—Irvin S. Thompson et al.

[57] ABSTRACT

A pneumatic sheet or strip conveying device controlled by an electronic programmer, for machines for working stacked sheet material, particularly for automatic presses for manufacturing container covers and bottoms, wherein said pneumatic device consists of three pneumatic cylinders, of which the first cylinder is provided for taking a sheet or strip from the material stack, the second cylinder is provided for bringing said sheets onto mechanical means conveying the sheet under a working tool, and a third pneumatic cylinder for expelling the worked sheet, said pneumatic cylinders being controlled by electronic programmer means.

3 Claims, 6 Drawing Figures

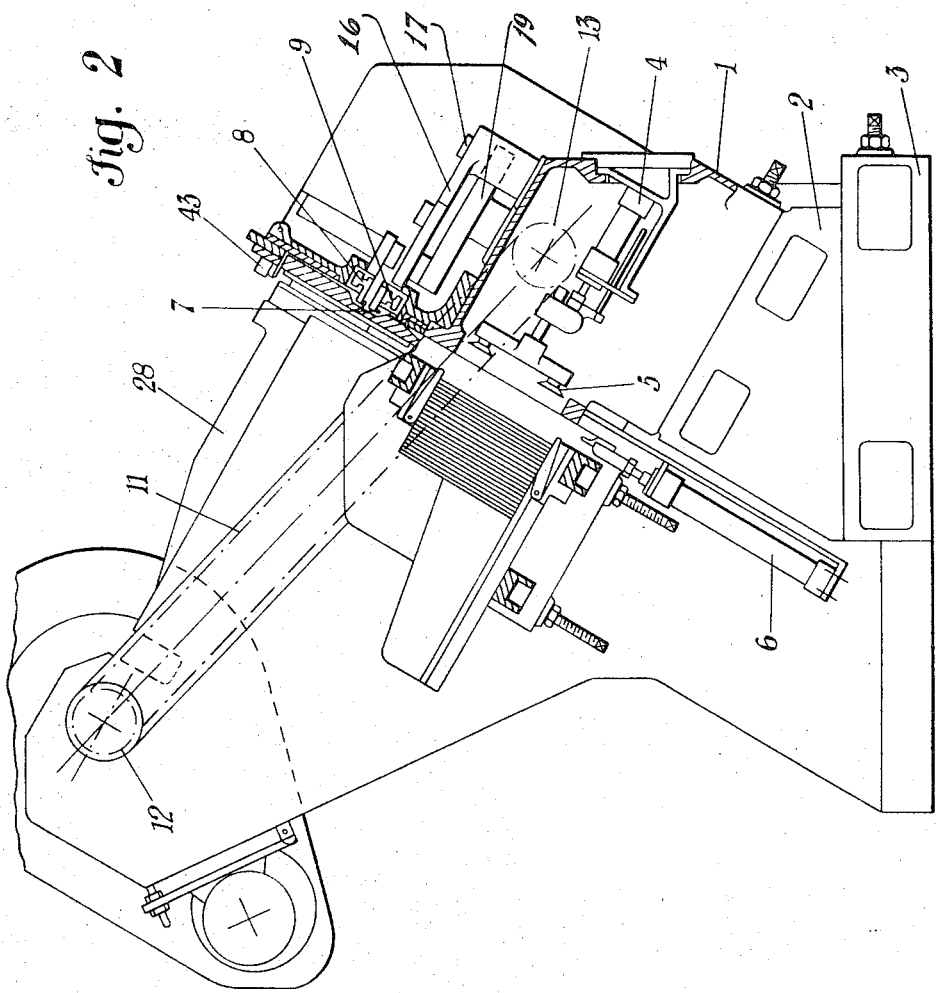

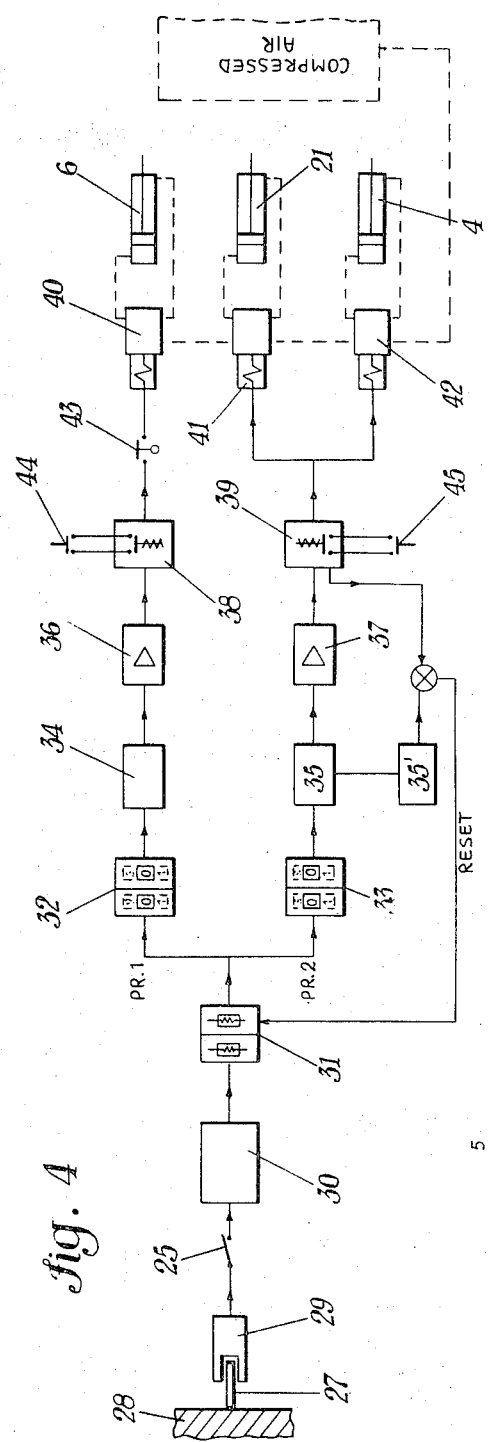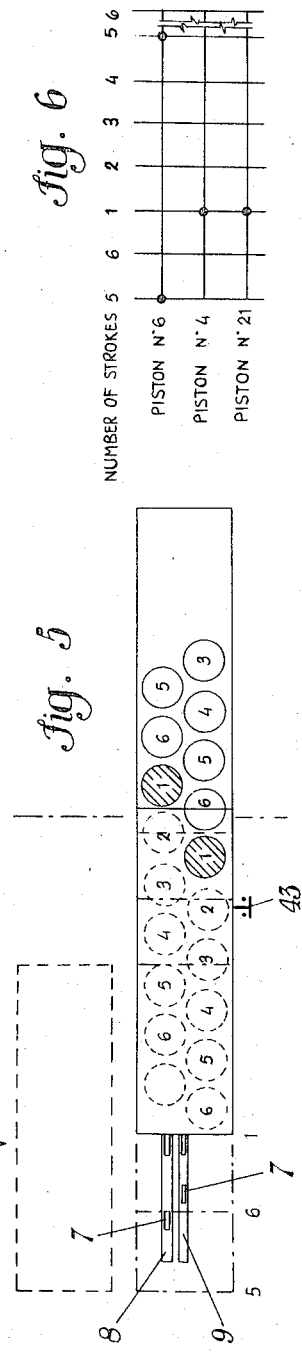

PNEUMATIC CONVEYING DEVICE CONTROLLED BY AN ELECTRONIC PROGRAMMER FOR MACHINES FOR WORKING STACKED SHEET MATERIAL

The present invention relates to a pneumatic conveying device controlled by an electronic programmer for machines for working stacked sheet material, particularly for automatic presses for manufacturing container covers and bottoms.

The commonly used machines for this kind of manufacture consist of a mechanical eccentric press and of a mechanical conveyor rigidly connected to the machine, which through gear wheels driven by the eccentric shaft, receives the movement for the mechanical members necessary for taking and conveying the strips to be timely carried between the working tools.

The strips, previously obtained from sheets of tin plate, are stacked in a suitable magazine of the conveyor and taken then, one at a time, in order to be carried on the plane of the conveyor by a suction cup system.

When the strips have so reached the plane of the conveyor, by an established number of pawls, according to the number of steps which the strip must move, they are carried step by step under the press working tools, for cutting and drawing the covers.

At the end of this operation, a cut off portion of the strip remains, as generated from the various surfaces removed by the tools, for obtaining the article to be manufactured. The cut-off portion is exlled from the machine before the arrival of the new strip, by a pair of rollers, one of which is continuously rotating while the other, the upper roller, is idle driven by means of cams, through a tie rod and a lever.

For all these operations, forming a repetitive cycle of work, said machines must be provided with a set of gears in order to allow the conveyor to time with the press all movements, depending upon the variations of the numbers of steps required for each strip in accordance with its length and the size of the article to be obtained.

These gears are located in a support fixed to the press, by means of screws passing through suitable elongated holes, allowing the support to be moved depending upon the size of the gears necessary for a given number of steps necessary for each strip.

These gears serve the functions as follows:

1. Control of the suction cups for taking the strips from the stack, and subsequent control of the pneumatic members for the start and the end of the suction cup operation.
2. Control of the ram for transfer of the strip delivered by the suction cups to the position corresponding to the conveying pawls.
3. Control of the cam for moving the upper idle roller close to the lower roller for expulsion of the cut off portion.

It should be noted that this conventional system whereby for each change of the strip or of the size it is necessary to change the set of gears, requires a long time during which the machine will be inoperative, due to disassembling and then mounting the gears, as well as a complete rearranging of the timing of all the members.

The purpose of the present invention is to avoid the use of mechanical means and gears for transmitting movement, by replacing them with pneumatic cylinders. Such a pneumatic cylinder system, actuated by an electronic programmer, allows a synchronized feeding of strips or sheets to be worked onto a mechanical conveyer and the expulsion of the worked strip.

According to this invention, in a machine having a stack of strip material to be worked, there are provided pneumatic means for taking the strips from the stack, pneumatic means for transferring the strip on a mechanical conveyer, pneumatic means for expelling the worked strip and an electronic device for programming the synchronized operation of said pneumatic means.

Said programmer device includes a detector of the operation of the press ram, means for deriving a logical signal from said detector; and preset counting means associated with down-counting circuits driven by said logical signal, said counting circuits being arranged for controlling said service means through electropneumatic actuators.

This invention will be now described with reference to the attached drawings showing by way of non limitative example one preferred embodiment of the invention itself.

In the drawings:

FIG. 2 is a cross sectional view of the pneumatic device along a transverse plane;

FIG. 3 shows the control of the electronic programmer;

FIG. 4 is a diagram of the electronic programmer associated to the pneumatic device; and FIGS. 5 and 6 show the diagram of the position of the strip and the operative diagram of the pistons respectively.

Figure 1:
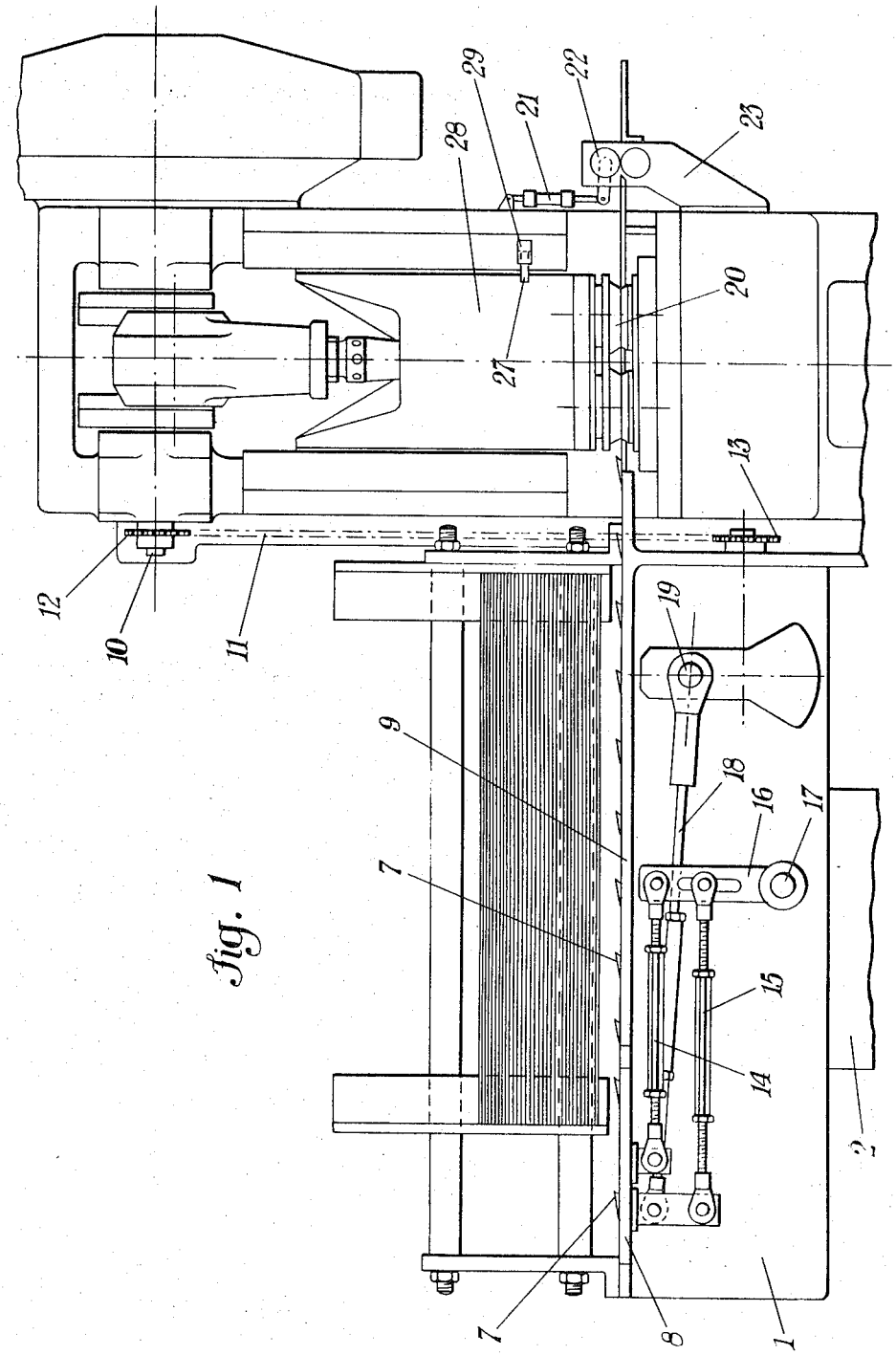
FIG. 1 is a side elevation view of the pneumatic device applied to a conventional eccentric press.

The conveyor shown in FIGS. 1 and 2, consists of a frame 1 of cast iron, resting on two slide blocks 2 and 3 in order to allow the alignment of the sliding plane of the strips, with that of the tools 20 of the press.

On the frame 1 there are arranged a pneumatic piston 4 controlling suction cups 5 for taking the strips and a pneumatic piston 6 for transferring the metal strip onto a mechanical conveyor consisting of bars 8 and 9 and carrying pawls 7 for feeding the strip. Said bars 8 and 9, which are connected by means of adjustable and independent tie rods 14 and 15 to a movable lever 16 having its pivot pin 17 at its lower end and connected in turn by another adjustable tie rod 18 to the crankpin 19 for the reciprocation, will be operated directly by the eccentric shaft 10 of the driving chain 11 by the gears 12 and 13.

The first bar 8, which is connected by the tie rod 14 to the end of the lever 16, serves the function of carrying out the first conveyance of the strip under the working tools 20 of the press.

The second bar 9, on the contrary, serves the function of continuing to convey, step by step, the strip up to the last draw. Piston 21 controls idle roller 22 of the means 23 for discharging cut-off material. This repetitive cycle of movement, similar to that of the conventional machines, will be programmed each time according to the number of draws necessary for a given strip to be worked, by the electronic device 24 of FIG. 3, by the two pre-setters ofprogram 32 and 33 (see also FIG. 4).

The program presetters 32, 33 are also controlled by pulses generated at each draw of the ram of the blanking press. Said electric pulses are obtained by means of a proximity detector operated by the variation of magnetic field according to an arrangement including a blade 27 rigid with the ram 28 of the press, arranged so as to pass through the shoes of an electromagnetic transducer 29, energized by an oscillator not shown in the figure, which due to the distortion of the electromagnetic field caused by the passage of the blade 27 produces a signal pulse which, transformed to logical level in the adapter 30, drives a visualized electronic counter 31 to which are connected two program pre-setters 32 PR.1, 33 PR.2.

When the counter 31 reaches the digits programmed on the presetters 32 and 33, signals will be emitted therefrom which through the transfer circuit 34 and 35 reach the amplifiers 36 and 37 which feed two timed relays 38 and 39 for actuating the electro valves 40, 41, 42 connected to the operating pneumatic pistons 4, 6 and 21.

With the transfer circuit 35 of the second program is associated a memory circuit 35' which serves the further function of memorizing the passed pulse utilizing it after energization of relay 39 for clearing the counter 31 which has reached the last programmed draw, thus resetting it for the repetition of the cycle.

Then, as for a determined strip to be worked a certain number of draws are necessary, these are pre-set on the pre-setter of the second program 33 while on the pre-setter of the first program 32 is set the digit corresponding to the digit of the draw in which the piston 6 must intervene for the transfer of the strip to the plane of the conveying bars 8 and 9.

This digit corresponds to the difference of the number of draws pre-set on the second program, minus the number of the draws necessary for the first conveying bar 8 to transfer the strip in correspondence with the tools 20 plus one draw for the intervention of the transfer piston 6. When the program as above described has been set, and the conveying pawls 7 have been adjusted, the machine is started so that upon pushing the starting push button 25 of the electronic device 24, the counter 31 starts counting the draws, which can be re-set by the press button 26.

At this moment, the counter 31 reaches the digits fixed on the pre-setters 32 and 33 and through the described circuits, start operating the relays 38 and 39 for controlling the pistons 4, 6 and 21 which, according to the programmed cycle, will intervene with the sequence as follows, shown in the diagram of FIG. 6:

I. Simultaneous intervention of the piston 4 for taking the strip from the magazine and of the piston 21 for controlling the idle roller for expelling the cut off material. This occurs when the counter 31 has reached the digit 1 of the second pre-setter, which digit, in the case of a strip for double tools, as shown in FIG. 5 corresponds to the first draw of the strip to be manufactured and to the last draw of the strip to be expelled.

II. Intervention of the piston 6 for transferring the strip from the position left from the suction cups 5 to the plane corresponding to the transport bars 8 and 9, when the counter 31 has reached the digit established on the first pre-setter 32.

For the last cited operation, between the relay 38 and the electrovalve 40 a consent microswitch 43 is inserted in the sliding plane of the strip, said microswitch closing the circuit each time that the worked strip frees the plane for the space necessary to receive the new strip.

The described unit serves the function of avoiding that the new strip will interfere with that already in the course of cutting if due to accidental causes, the strip should remain stationary, occupying the space for the emission of the subsequent strip.

The electronic device 24 is also provided with two push buttons 44 and 45 each for manually controlling the two programs, so as to allow the operator to manually carry out one or more testing cycles for the established program or for a program to be established.

The present invention has been described in one preferred embodiment, it being however understood that constructive changes might be practically adopted without departing from the scope of the present invention.

I claim:

1. In a machine for working strip material collected in a stack, having tool means and mechanical means for feeding the strip to be worked to and mechanical means for removing the worked strips from the tool means; the improvement comprising a first pneumatic cylinder, a plurality of suction cups for taking the strip from said stack controlled by said first pneumatic cylinder, a second pneumatic cylinder for transferring said strip to be worked onto said mechanical means and feeding it under said tool means, a third pneumatic cylinder controlling said mechanical means for removing the worked strip from said tool means, and electronic programmer means operatively connected with said pneumatic cylinders for sequentially controlling said first, second and third cylinder.

2. A machine as claimed in claim 1 wherein said electronic programmer means comprises an electronic circuit controlled by a blade fixed to said tool means to follow the movement of the tool means and to pass through shoes of an electromagnetic transducer to generate signal pulses controlling the electronic circuit, and electro-valve means to actuate said pneumatic cylinders.

3. A machine as claimed in claim 2, wherein said electro-valve means comprises a first electro-valve controlling said first pneumatic cylinder, a second electro-valve controlling said second pneumatic cylinder and a third electro-valve controlling said third pneumatic cylinder.

* * * * *